United States Patent [19]

Kay

[11] Patent Number: 4,703,579

[45] Date of Patent: Nov. 3, 1987

[54] FISHING LURE

[76] Inventor: Paul D. Kay, 28 King St. W., Apt. 203, Stoney Creek, Ontario, Canada, L8G 1H4

[21] Appl. No.: 903,349

[22] Filed: Sep. 3, 1986

[51] Int. Cl.[4] ............................................. A01K 85/00
[52] U.S. Cl. ................................. 43/42.19; 43/42.24; 43/42.29
[58] Field of Search .................. 43/42.09, 42.19, 42.24, 43/44.83, 44.39, 44.81, 42.29

[56] References Cited

U.S. PATENT DOCUMENTS

| | | | |
|---|---|---|---|
| 1,867,555 | 7/1932 | Hildebrandt | 43/42.09 |
| 2,750,701 | 6/1956 | Beames | 43/42.09 |
| 3,224,133 | 12/1965 | Emard | 43/42.24 |
| 3,724,116 | 4/1973 | Lindner et al. | 43/42.24 |
| 3,936,971 | 2/1976 | McGahee | 43/44.83 |
| 3,987,576 | 10/1976 | Strader | 43/42.19 |
| 4,010,569 | 3/1977 | Finley et al. | 43/44.83 |
| 4,094,087 | 6/1978 | Carpenter | 43/42.24 |
| 4,167,076 | 9/1979 | Weaver | 43/42.24 |
| 4,334,381 | 6/1982 | Carver et al. | 43/44.81 |

*Primary Examiner*—M. Jordan
*Attorney, Agent, or Firm*—Rogers & Scott

[57] ABSTRACT

A fishing lure of the weedless type has a leader over which extends a sinker member with an open base portion within which is located a hook attachment eye. A flexible tie of selected length, generally comprising a portion of fishing line, secures the hook to the attachment eye, permitting in use the insertion of a worm in concealing protective relation over the flexible tie and the barb of the hook, thereby providing a smoothly profiled, substantially weedless lure. The leader, in addition to the sinker, incorporates a rotatable spinner and a spacer member in the form of a coil spring encircling the stem of the leader in interposed relation between the spinner and the sinker. The sinker is of substantially bell shape, to promote snag-free characteristics to the lure, while serving under the action of the coil spring as a keeper to retain the flexible tie and hook in secured relation with the attachment eye.

7 Claims, 1 Drawing Figure

FISHING LURE

BACKGROUND OF THE INVENTION

The present invention relates to fishing lures, and in particular to a weedless combination incorporating a profiled sinker and flexible hook tie.

The use of worms with hooks in the so-called Texas-sling arrangement, in order to achieve a substantially "weedless" arrangement, is well known.

U.S. Pat. No. 3,724,116 Apr. 3rd, 1973 Lindner et al shows one such arrangement, having a long shank sproat hook in combination with a plastic worm, the hook incorporating a special J-shaped eye terminal to engage the worm.

Another arrangement, U.S. Pat. No. 4,334,381 June 15th, 1982 Carver et al incorporates a plastic worm secured to the leader directly by a barbed attachment rod, the hook point being laterally embedded therebelow. A protective apron of fibres or bucktail may surmount the hook shank in order to promote the "weedless" operation thereof.

The use of shaped sinkers is well known also, as illustrated by U.S. Pat. Nos. 2,241,367 May 6th, 1941 Serff, and U.S. 2,672,704 March 23rd, 1954 Smith.

SUMMARY OF THE INVENTION

In accordance with the present invention there is provided a fishing lure of substantially weedless type having a fish line leader including a stem portion thereof terminating in a first eye for attachment of the fishing line thereto, a second eye located at the opposite end of the leader and a profiled sinker member having an open base extending in substantially protective relation about the second eye; flexible hook attachment means of predetermined length looped to the second eye and having a fish hook attached in looped relation thereto, the flexible attachment means facilitating, in use, the attachment of a worm in enveloping relation over the attachment means while permitting positioning the barb of the hook in protected offset relation relative to the axis of the leader.

The provision of the flexible hook attachment means permits the hook and the worm to conform readily with obstructions which may be encountered, to thereby enhance the snag free weedfree characteristics of the lure.

Furthermore, the capability of selecting a preferred length for the flexible tie permits the setting of the hook so that the hook member can engage the worm at the thickened collar region, regardless of the size of the worm being used. In addition, the attachment of the flexible tie to the eye of the leader substantially within, or adjacent to the protection afforded by the skirt portion of the sinker element makes it feasible for the head of the worm to be partially enveloped and protected by the skirt of the sinker, from entrapping contact with environmental hazards, thereby minimizing the vulnerability of the worm to damage.

BRIEF DESCRIPTION OF THE DRAWINGS

In order that the invention may be better understood, a single embodiment thereof will now be described by way of example only, with reference being made to the accompanying drawings, wherein.

DETAILED DESCRIPTION OF THE PREFERRED EMBODIMENT

Figure 1:
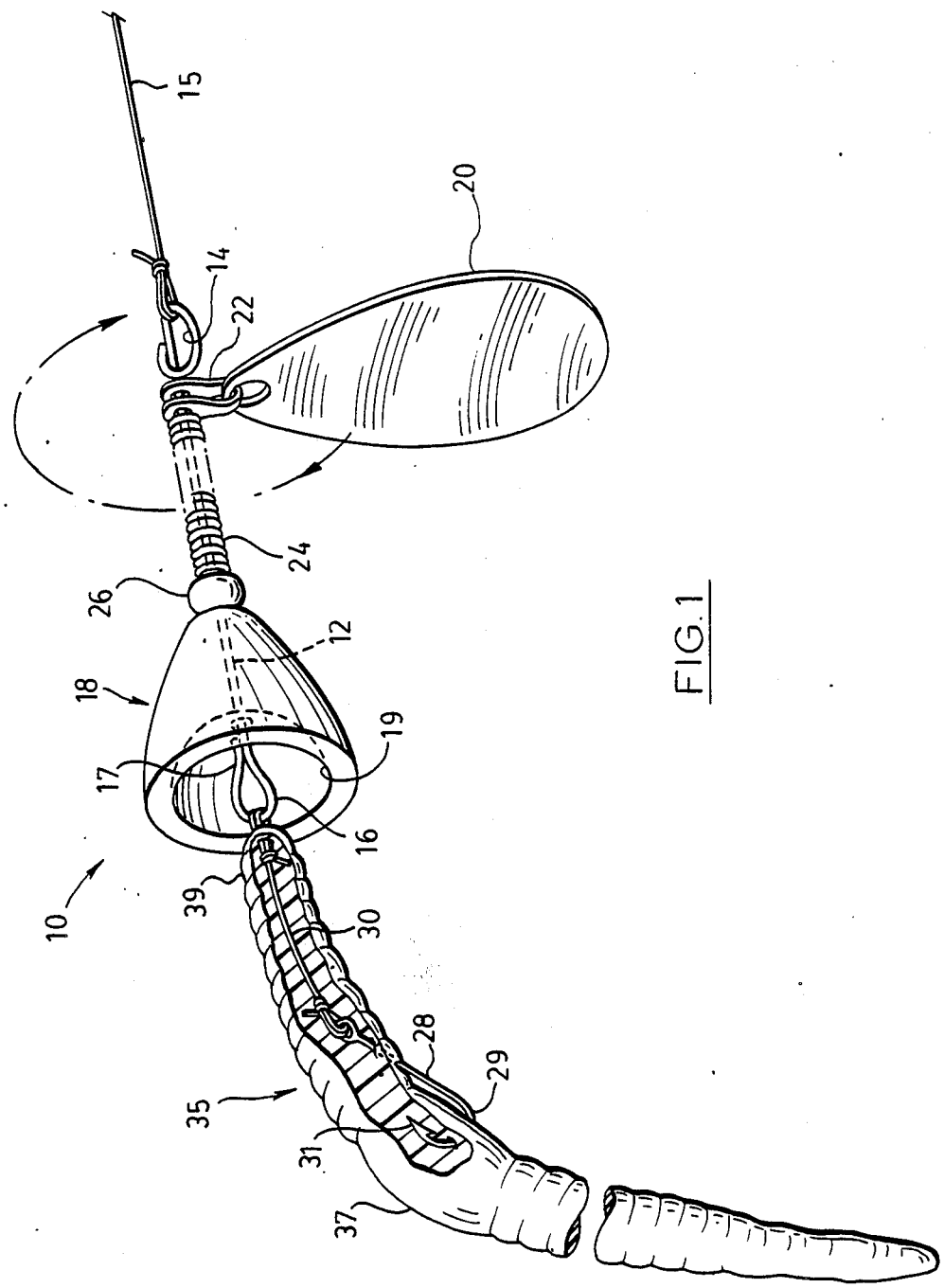
FIG. 1 of the drawing is a general view, in partial section showing the subject lure having a worm in baited relation thereon.

The illustrated lure 10 has a leader portion 12 with a first eye 14 to which a fishing line 15 may be tied. A second eye 16 is provided at the downstream end of the leader portion 121.

A hollow bell-shaped sinker 18 fits over one end of the leader portion 12, and a spinner 20 is suspended from the upstream end of the leader portion 11 by looped link member 22, with a fine congression spring 24 located therebetween, being illustrated with the coils thereof in compressed relation against a spacer bead 26.

A hook 28 is tied by a portion of line 30 to the second eye 16, to provide a flexible tie attachment of selectible length.

The length of the tie attachment 30 is generally related to the worm 35, being selected such that the hook portion 29 penetrates the thickened collar portion 37 of the worm.

In the illustrated condition the upstream end 39 of the worm abuts the second eye 16, whereby when the sinker 18 is released under the action of spring 24, the bell mouth portion 19 of the sinker 18 extends in protective, overlying relation around the eye 16 and the worm end portion 39.

Thus it will be seen that the worm 35 and the flexible tie attachment 30 for the hook permit the hook 28 and worm 35 to take up variable, non-snagging positions relative to the second eye 16 of the leader 12, while the hook 28 and worm 35 can achieve the desired Texas-sling arrangement having the barb 31 of the hook 28 effectively protected within the worm 35 against snagging.

The illustrated second eye 16 has a free end 17 that enables the removal of the tie 30 and hook 27 by simple sliding disconnection, and the re-insertion of another tie 30 of selected length, with hook. The sinker 18 serves as a keeper and engages the open end of eye 16, when urged thereover by spring 24, to preclude accidental disengagement of the tie 30 and hook 28.

The subject lure 10 is suited for use with natural worms of suitable length or with artificial worms of suitable properties.

While but one form of the present invention has been described and illustrated, various changes apparent to those skilled in the art may be made to the illustrated embodiment without departing from the scope of the invention as set out in the appended claims. For example, the illustrated coil spring 24 can be replaced by a solid or otherwise form of spacer element and still achieve the primary objects of the invention as previously stated herein.

I claim:

1. A fishing lure of the substantially weedless type comprising, in combination, a thin, elongated, substantially rigid shaft having a stem portion thereof terminating in a first eye for attachment of a fishing line thereto and a second eye located at the opposite end of said stem portion; a profiled sinker member positioned on the stem portion and having an open base extending in substantially protective relation about said second eye; a flexible hook attachment means of predetermined length looped to said second eye at one end, and having a fish hook attached in looped relation thereto at the opposite other end, said flexible attachment means facilitating, in use, the attachment of a worm in enveloping relation over said attachment means and said second eye, while permitting positioning of said hook in protected, offset relation relative to the axis of said leader.

2. The lure as set forth in claim 1, wherein there is provided spacer means located between said sinker member and said first eye, to permit displacement of said sinker member away from said leader second eye and to facilitate baiting of a worm in adjoining relation to said second eye.

3. The lure as set forth in claim 1, wherein said worm is an artificial plastic worm.

4. The lure as set forth in claim 1 wherein said spacer means comprises a compression spring mounted in surrounding relation about said stem portion for resiliently urging said sinker member in enveloping protective relation with said second eye and said hook attachment means.

5. The lure as set forth in claim 4, wherein there is provided a spinner member rotatably mounted on said leader and located between said leader first eye and said compression spring.

6. The lure as set forth in claim 4, wherein said profiled sinker member is axially slidable away from said second eye to facilitate untying of said flexible hook attachment means and retying of a said hook to said second eye.

7. The lure as set forth in claim 4, wherein said flexible hook attachment means is slideably detachable from said second eye, said sinker means serving as a keeper, in use to preclude inadvertent detachment of said hook attachment means from said second eye.

* * * * *